Oct. 6, 1970    J. R. CRAIG ET AL    3,532,882
X-RAY TABLE MOUNTED FOR CONSTANT TRANSLATIONAL
MOVEMENT AND NONLINEAR ROTATIONAL MOVEMENT
Original Filed Nov. 16, 1965    3 Sheets-Sheet 1
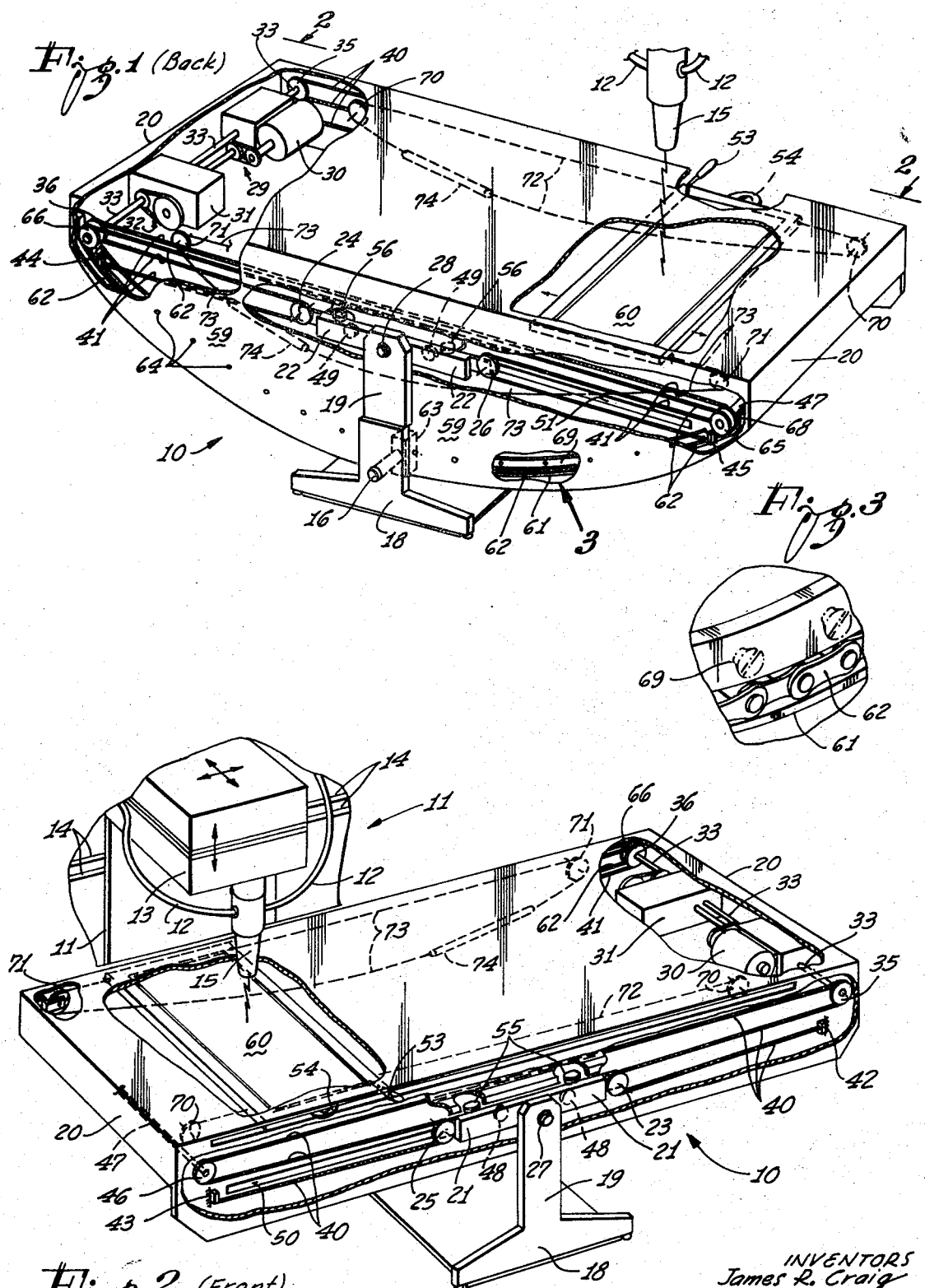
INVENTORS
James R. Craig
George W. Otto, Jr.
By John B. Miller, Jr.
Agent

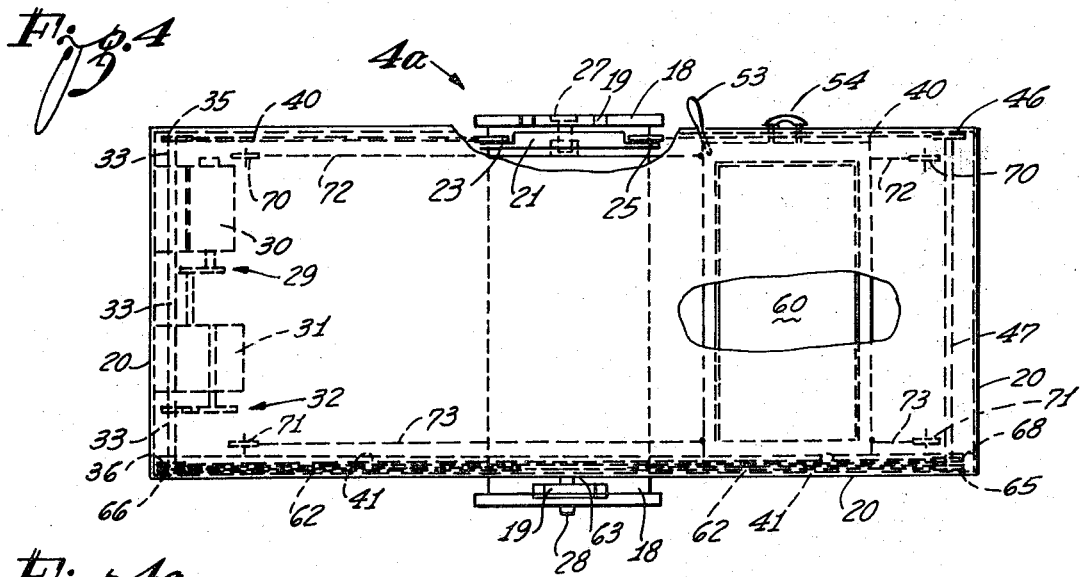
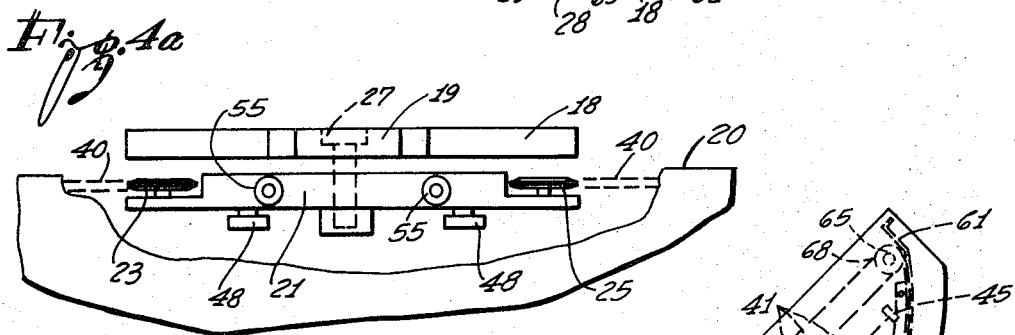
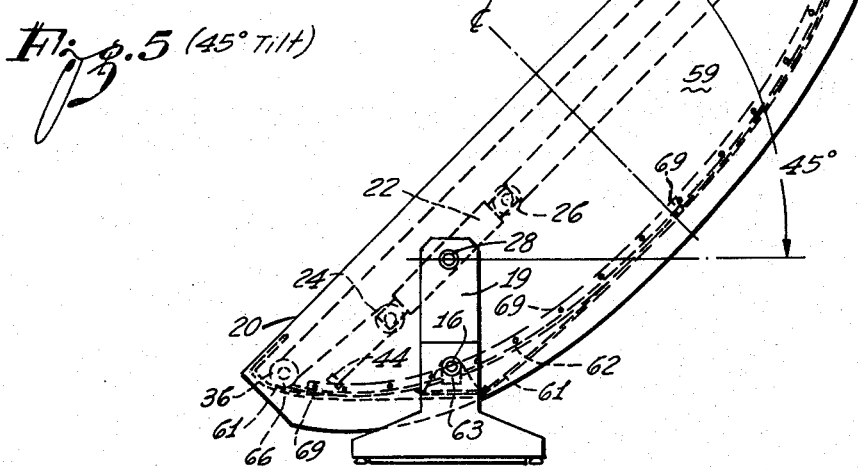

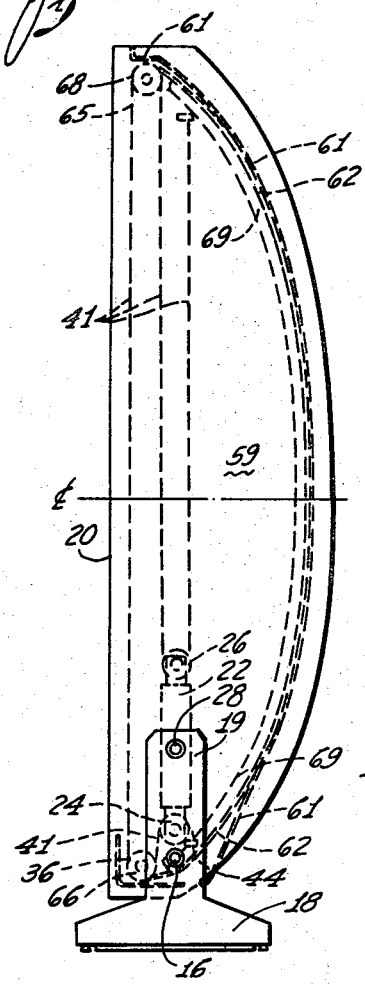
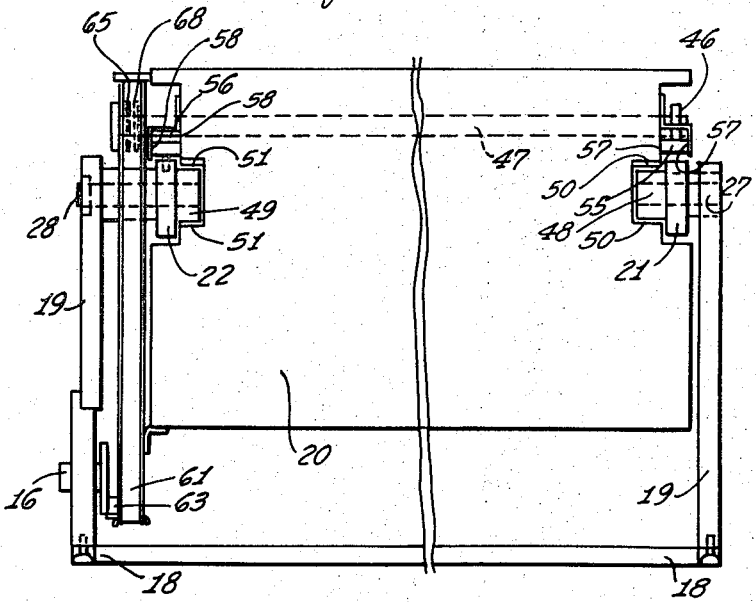

United States Patent Office 3,532,882
Patented Oct. 6, 1970

3,532,882
X-RAY TABLE MOUNTED FOR CONSTANT TRANSLATIONAL MOVEMENT AND NONLINEAR ROTATIONAL MOVEMENT
James R. Craig, Glenview, and George W. Otto, Jr., Elmhurst, Ill., assignors to Litton Medical Products, Inc., Des Plaines, Ill., a corporation of Delaware
Continuation of application Ser. No. 508,038, Nov. 16, 1965. This application Dec. 11, 1968, Ser. No. 785,044
Int. Cl. G01n 23/00
U.S. Cl. 250—55                    2 Claims

ABSTRACT OF THE DISCLOSURE

An improved X-ray table that may be selectively tilted, in either direction, through a complete range of angular positions, from a horizontal position to a vertical position. The X-ray table has its entire drive mechanism mounted within the table. The table is translated by one pair of chains while being tilted by a third chain. The X-ray table may be tilted as it is translated by arcuate means wherein the translational movement is constant and the rotational movement is nonlinear, that is, the rotational movement changes very slowly around the horizontal position, while changing rapidly near the vertical position.

---

The present patent application is a continuation of the patent application, Ser. No. 508,038, entitled "X-ray Apparatis" filed on Nov. 16, 1965, now abandoned.

The present invention relates, generally, to an X-ray table and, more particularly, to an improved X-ray table that may be selectively tilted through a complete range of angular positions from the horizontal to a full ninety degrees from the horizontal in either of two directions, and that affords complete accessibility around the table.

The discovery of X-rays made it possible to diagnose by painless, efficient techniques areas of the human body which had been completely inaccessible. From the beginning, the diagnostic uses of X-rays have been divided chiefly into fluoroscopic and radiographic techniques.

Fluoroscopic observation of a patient permits a study of a living organism in action. In fluoroscopy of the heart, for example, its expansion and contraction can be directly observed. The various chambers of the heart can be distinguished and their functions, in relation to the other chambers, determined by turning the patient in various directions. In radiography, a very accurate permanent record of the patient's body tissues can be obtained from which any variation from normal can be readily detected. By varying the position of the patient, parts can be recorded from different angles to enable a physician to make an accurate determination of the size and extent of any infection.

The X-ray apparatus used for radiography and fluoroscopy is undergoing constant change, and specialized accessories are being continually designed to facilitate more modern procedures. An especially useful accessory which has been often improved is the X-ray table which permits the fluoroscopic and radiographic examinations noted above to be made in the various positions of the patient. With the most versatile of such X-ray tables, the patient may be placed in virtually any conceivable position by tilting the table structure in some manner.

However, many problems have prompted X-ray table manufacturers to seek new constructions. The manufacturers have, for example, attempted to reduce the size and complexity of the tilting apparatus to provide complete access around the table, and to provide a table that may be tilted ninety degrees from the horizontal in either direction to one of two vertical positions. The last of these problems has been solved by the class of X-ray tables having a table body pivotally coupled to a supporting base or structure so that the table body is tiltable to either of the two ninety degree vertical positions. These tables are known as ninety-ninety tables.

The various positions at which the table body of a ninety-ninety table may be placed are particularly important when an examining physician is attempting to observe the operation of, and the movement of materials through, various organs of a patient's body ordinarily not distinguishable by X-ray. These cavities are studied after filling them with a material (one of the so-called opaques) which are noninjurious to the patient's tissues but which have sufficient density to obstruct the passage of the rays.

For example, the neurologist and neurosurgeon in the diagnosis of a disease of the spinal column during a myelographic examination may inject an opaque solution and fluoroscopically view the passage of the fluid in the spinal canal. In order to make the fluid flow, however, the patient's body must be slowly rocked back and forth a few degrees about the horizontal position. This rocking motion causes the opaque fluids to pool in the spinal canal.

Another use of a ninety-ninety X-ray table occurs during a fluoroscopic examination of the digestive system. The patient is given a solution to drink that is sufficiently dense to cast a clear shadow on the screen of the fluoroscope. The X-ray table is tilted to a ninety degree position, and the patient stands with his back to the table, behind the screen. The observe positions himself in front of the screen with the controls of the X-ray unit at hand, and observes through the fluoroscope the progress of the solution through the patient's body.

Accordingly, it is apparent that a ninety-ninety X-ray table that may be used both in examining the flow of spinal fluids and in examining the digestive system is a necessary tool of the modern-day X-ray technologist.

Although prior art ninety-ninety tables have been found to perform reasonably well in many applications, there are several disadvantages accompanying their use. Of major importance is the provision of sufficient floor space for the end of the X-ray table to swing from the horizontal position to positions having high angles of inclination. In order to provide sufficient floor clearance, the tops of many tables have been made so high above the floor that it is often difficult for the disabled patient to climb thereon, even with the assistance of a step stool. Moreover, the height of such an X-ray table obviously is important to the examining physician who must look downwardly on to the fluoroscopic screen which overlies the patient laying on the table when the table is in a horizontal or near-horizontal position. The range of adjustment of the fluoroscopic screen above the table is fixed and dependent upon the height of the table top. Consequently, with many prior art tiltable X-ray tables the screen is often somewhat higher than is desirable, and physicians of average or less than average heights sometimes find it difficult to stand comfortably on the floor adjacent to the table and screen the patients.

A number of proposals have been made to provide an X-ray table having a low table top that is easily accessible to both patient and physician and yet may be tilted conveniently from the horizontal to the vertical. For example, X-ray tables have been proposed which include table bodies that may be simultaneously translated as they are tilted. The translational movement is usually nonlinear, starting from the horizontal with a relatively high speed which diminishes as the translation continues. The rotational movement of such a table is held constant.

However, the driving mechanisms for this type of prior art X-ray table often include spirally-convoluted cams which are difficult and costly to construct. More importantly, most often the driving mechanisms are mounted entirely external to the table body on one side thereof, requiring a substantial amount of space and preventing the movement of the examining physician completely around the table. The rapid translational movement of the table body about the horizontal position, moreover, disrupts the procedures outlined above for pooling spinal fluids in the spinal canal. Thus, this rocking process must be accomplished by hand.

It is, therefore, one of the principal objects of the present invention to obtain complete accessibility around a ninety-ninety X-ray table having a relatively low table top.

Another object of the present invention is to facilitate the construction of a ninety-ninety X-ray table.

Still another object of the present invention is to utilize the motion of a tilting X-ray table to accomplish the pooling of fluids within the body of a patient.

An additional object of the present invention is to provide an X-ray table in which the table body is translated while simultaneously being rotated about the pivot.

A further object of the present invention is to provide an X-ray table wherein the translational movement of the table body is constant while the rotational tilting movement is nonlinear, starting from the horizontal with a very low angular speed and increasing as the translation and rotation continue.

These and other objects are accomplished in accordance with features of the present invention by a ninety-ninety X-ray table which has its entire drive mechanism mounted within the table rather than externally, affording complete accessibility around the table. Briefly, in accordance with an illustrative embodiment of the invention, there is provided a table body which is translated by one pair of chains while being tilted by a third chain. Each chain is mounted within the table body and is driven by the drive mechanism so that the table body not only translates, but also tilts. The table body is tilted as it translates by an arcuate rail which guides the third chain such that the table rotates progressively at more rapid speeds. This drive mechanism provides the maximum amount of table body control for moving the table body to any desired location and for oscillating the table body above the horizontal. Moreover, the driving mechanism is easily constructed, designed for minimal wear and, therefore, capable of use over extended periods of time.

These and other advantages and features which are believed to be characteristics of the present invention, both as to its organization and method of operation, will be better understood from the following description considered in connection with the accompanying drawings, in which one embodiment of the present invention is illustrated by way of example. It is to be expressly understood, however, that the drawings are for the purpose of illustration and description only and are not intended as a definition of the limit of the invention.

In the drawings:

FIG. 1 is a perspective view of the back side of an X-ray table constructed in accordance with teachings of the invention, the drawing being cut away to show portions of the drive mechanism for the table;

FIG. 2 is a perspective view of the front side of the X-ray table illustrated in FIG. 1, the figure illustrating additional parts of the drive mechanism for the table;

FIG. 3 is a partial perspective view of a part of the tilting drive mechanism showing a tilt chain riding on an arcuate rail;

FIG. 4 is a top view of the X-ray table of the invention illustrated in FIGS. 1 and 2;

FIG. 4a is a partial top view of a pivot carriage used to support the body of the X-ray table shown in FIGS. 1 and 2;

FIG. 5 is a side view of the X-ray table illustrated in FIGS. 1 and 2 showing the table body translated and tilted forty-five degrees from the horizontal;

FIG. 6 is a side view of the X-ray table shown in FIGS. 1 and 2 illustrating the table body translated to its maximum distance and rotated to a vertical position ninety degrees from the horizontal; and FIG. 7 is an end view of the X-ray table shown in FIGS. 1 and 2, illustrating the connection of the pivot carriages with roller tracks in the table body.

Referring now to the drawings, wherein like or corresponding parts are designated by the same reference characters throughout the several views, there is shown in FIG. 1 an X-ray table 10 constructed in accordance with teachings of the present invention. The X-ray table 10 is shown to comprise a supporting base 18 constructed primarily of steel and bolted to the floor. Extending upwardly from the base 18 are a pair of supporting columns 19, parallel to one another, for holding and supporting a table body 20 therebetween. A pivot carriage is pivotally connected to the top of each supporting column 19, a pivot carriage 22 being illustrated in FIG. 1 coupled to the column 19 by means of a pivot assembly 28. On the pivot carriage 22, to either side of the pivot assembly 28 and projecting inwardly towards the table body 20, are mounted a pair of rollers 49 for longitudinally and vertically stabilizing the table body 20 and for engaging a roller track 51 on the back side of the table body 20. The roller track 51 slidably receives the rollers 49 for enabling the table body 20 to longitudinally translate with respect to said pivot carriage 22. A pair of rollers 56 are also mounted on the top of the pivot carriage 22 and slidably engaged with a roller track 58 (not shown in FIG. 1) which runs the length of the table body 20 for imparting transverse stability to the table body 20 as it moves from its central horizontal position. Additionally, a pair of sprockets 24 and 26 are rotatably connected at opposite ends of the pivot carriage 22 and are a part of the translational driving mechanism for the table body 20.

It will be noted in FIGS. 1 and 4 that accessibility around the X-ray table 10 of the present invention has been significantly improved by mounting the entire driving mechanism within a volume defined by the lateral boundaries of the table body 20. For example, in FIGS. 1 and 4 it is shown that a motor 30 is mounted to one end of the table body 20 and coupled to a drive shaft 33 (at the one end of the table body 20) through a speed reducer 31 for rotating the drive shaft 33. A chain and sprocket assembly 29 is used to couple the motor 30 to the speed reducer 31; while a chain and sprocket assembly 32 interconnects the speed reducer 31 and the drive shaft 33. To longitudinally translate the table body 20, a drive sprocket 36 is rigidly secured to one end of the drive shaft 33 for rotation therewith. At the other end of the table body 20 from the drive shaft 33, an idler shaft 47 is rotatably mounted; and to the end of the idler shaft 47 is rigidly secured an idler sprocket 68 for rotation with the idler shaft 47. One end of a longitudinal drive chain 41 is secured at the one end of the table body 20 by a chain anchor 44; and the other end of the chain 41 is secured at the other end of the table body 20 by a chain anchor 45. The drive chain 41 from the chain anchor 44 to the chain anchor 45 passes around and interconnects the sprocket 24, the sprocket 36, the sprocket 68, and the sprocket 26 (in that order) for translating the table body 20 with respect to the pivot carriage 22 in response to rotation of the drive shaft 33. From the description of the figures which hereinafter follows, it will become clear how this drive chain 41 cooperates with a second longitudinal drive chain 40 and a table tilt chain 62 to translate and tilt the table body 20 with respect to the base 18.

Disposed beneath the top surface of the table body 20, as shown in FIGS. 1 and 4, is a bucky 60 that travels on tracks (not shown) and that is guided by a pair of pulley and cable arrangements, one on each side of the bucky 60. More particularly, on the back side of the table body 20, a pair of pulleys 71 have a cable 73 trained around them which is attached to the bucky 60. Similarly, on the front side of the table body 20, a pair of pulleys 70 have a cable 72 trained around them, which cable 72 is attached to the front side of the bucky 60. A locking handle 53 secures the bucky 60 to the cable 73 and holds it in the desired location. Each of the cables 72 and 73 has a weight piece 74 connected to it for counterbalancing the bucky when the table body 20 is tilted to a position of high angle of inclination. The bucky 60 is also provided with a handle 54 which projects from the front side of the table body 20 and permits manipulation of the bucky 60 during the use of the table 10. Since further details of the internal construction and arrangement of the various parts of the bucky 60 are all well known to those skilled in the art, these features are not shown or described more fully herein.

The mechanism for tilting the table body 20 is shown in FIG. 1 to include a tilt chain idler sprocket 65 mounted to the idler shaft 47 next to and outwardly from the idler sprocket 68. In a similar position on the drive shaft 33, a tilt drive sprocket 66 is mounted aside the drive sprocket 36. Trained around the tilt chain idler sprocket 68 and the tilt drive sprocket 66 is a tilt chain 62, which also passes around and lays against a chain guide 69 having an arcuate shape. The tilt chain 62 is anchored to the base 18 by a chain anchor 63 (pivotally coupled to the base 18 by a pivot bolt 16) so that the chain 62 will not rotate.

In FIG. 1 the chain guide 69 is shown to include an arcuate rail. The guide 69 will hereinafter be referred to as the arcuate rail 69. The arcuate rail 69 is welded or otherwise rigidly secured to the side of the table body 20 and extends downwardly towards the base 18. The arcuate rail 69 is designed so that it will remain adjacent to the chain anchor 63 on the base 18 when the table body 20 is in any angular position relative to the base 18. Moreover, the curvature of the rail 69 enables it to remain contiguous with the base 18 as the table body 20 is tilted and translated from the horizontal position.

As shown in the partial view of the tilting mechanism, illustrated in FIG. 3, the tilt chain 62 rides along the arcuate rail 69. The chain 62 is covered, on the opposite side of the chain 62 from the rail 69, by a webbed strap 61 for preventing grease and oil on the chain 62 from falling onto the floor beneath the table 10. A curved side panel 59 is welded or bolted to the back side of the table body 20 and extends downwardly therefrom covering the tilt chain 62 and the arcuate rail 69 for helping to support the arcuate rail 69 (which is bolted to the panel 59 by the bolts 64) and for preventing the garments of patients and examining physicians from catching in the tilt chain. The line of bolts 64, shown in FIG. 1, generally follows the center line of the arcuate rail 69.

The shape of the arcuate rail 69 was determined empirically. The size of the sprockets 65 and 66 and the length of the chain 62 were chosen, and a distance over which the pivot point (the center of the pivot assembly 27, for example) could translate was selected. It was known that a constant radius would have to be maintained between the pivot point and the center of the chain anchor 63 as the pivot point was translated in a straight line along the table body. In the embodiment of the invention which is described, for example, it was known also that the desired result was to rotate the table body 20 to its ninety degree position from the horizontal while translating the pivot point in a straight line from the center line CL of the table body 20 (as shown in FIG. 6) to a point twenty-two inches from the center line CL. Also, when the table body 20 reached the ninety degree position, there must have passed around the sprocket 66 a length of chain measurable (when the table body 20 is in the horizontal position) from the chain anchor 63 along the arcuate rail 69 up to the sprocket 66. Generally, then, the resulting curve of the arcuate rail 69 was plotted and found to be a locus of points equidistant from the pivot point as the pivot point moves in a straight line perpendicular to the center line CL of the table body 20, and as the center line CL rotates from a vertical orientation (when the table body is horizontal) to a horizontal orientation (when the table body 20 is vertical).

Continuing with the description of the invention as shown in the drawings, it may be seen that on the front side of the table 10 (as shown in FIGS. 2 and 4) a pivot carriage 21 is pivotally mounted by a pivot assembly 27 on the column 19 which extends upwardly from the base 18. The pivot carriage 21, similar in construction to the pivot carriage 22, is shown to have a pair of rollers 48 affixed thereto which slidably support the table body 20 and engage with a roller track 50 within the front side of the table body 20. Additionally, a pair of rollers 55 is mounted on the top of the pivot carriage 21 and slidably engages with a roller track 57 (not shown in FIG. 2), which runs the length of the table body 20, for cooperating with the rollers 56 to impart transverse stability to the table body 20 as it is moved from the horizontal position. A pair of sprockets 23 and 25 is rotatably affixed to opposite ends of the pivot carriage 21 for cooperating with an idler sprocket 46 (mounted to the front side end of the idler shaft 47) and a drive sprocket 35 (mounted to the front side end of the drive shaft 33), respectively, to move a second longitudinal drive chain 40. The drive chain 40 is connected at one end of the table body 20 by a chain anchor 42 and at the other end of the table body by a chain anchor 43. The chain 40 passes around and interconnects the sprocket 23, the sprocket 35, the sprocket 46, and the sprocket 25 (in that order) for translating the table body 20 in cooperation with the drive chain 41, on the back side of the table body 20, in response to rotation of the drive shaft 33.

Positioned above the X-ray table 10, as shown in FIG. 2, an X-ray tube assembly 11 is slidably mounted on a pair of longitudinally extending rails 14 which are affixed to the wall $w$. It will be noted that the X-ray tube assemby 11 extends outwardly from the wall $w$ on a telescoping frame 13, the frame 13 being internally provided with counter-balancing springs and slidably supported on the rails 14. Since the details of the internal construction and arrangement of the parts of the X-ray tube assembly 11 are all well known, these features are not shown or described more fully. It will be noted, however, that an X-ray tube 15 is mounted at the end of the telescoping frame 13 and is operated through suitable high-voltage cable 12 which is connected to a conventional high-voltage source (not shown). The X-ray tube assembly 11, furthermore, customarily is provided with such accessories as a spot film device above the X-ray table 10, such a spot film device also preferably including a fluoroscopic screen which is used in cooperation with a second X-ray tube (not shown) mounted within the X-ray table 10. The entire X-ray tube assembly 11 is capable of being positioned relative to the X-ray table 10 in a number of positions so that the patient can be treated or examined.

It may be seen in the partial top view of the pivot carriage 21, shown in FIG. 4a, how the pivot carriages 21 and 22 are pivotally secured to the columns 19 by pivot assemblies 27 and 28, respectively. Moreover, the pair of rollers 48 and the pair of rollers 55 are shown in FIG. 4a in their respective positions on the pivot carriage 21 for supporting and imparting stability to the table body 20 as the table body 20 translates with respect to the pivot carriages and rotates with respect to the table base 18.

The table body 20 is illustrated in FIG. 7 in its horizontal position. As indicated above, the table body 20 can be clearly seen to be slidably connected to the pivot carriages 21 and 22 by the pairs of rollers 48 and 49, respectively. The rollers 48 and 49 are shown in FIG. 7 to project into their respective tracks 50 and 51, in the sides of the table body 20 provided for that purpose. The tracks 50 and 51 are U-shaped tracks which fit within the front and backside, respectively, of the table body 29. It is also shown that stabilizing rollers 55 and 56 ride on the tracks 57 and 58, respectively, in the side of the table body 20 for imparting transverse stability to the table as it translates with respect to said pivot carriages 21 and 22. It may also be seen in FIG. 7 that the pivot assembly 28 is considerably longer than the pivot assembly 27 for the reason that it must pass from the pivot carriage 22 through the tilt chain mechanism, including the arcuate rail 69, before engaging the column 19.

In the use of the X-ray table of the invention, assume that the table body 20 is normally in a horizontal position and, also, that the motor 30 is off. Assume further that the table, as shown in FIG. 1, is to be tilted in a counterclockwise direction so that the end of the table body 20 containing the motor 30 will be drawn down towards the base 18. When it is desired to tilt the table body 20, the motor 30 is energized, thereby causing the drive shaft 33 to rotate. In this instance, the drive shaft 33 will be rotated in a clockwise direction by the motor 30, thereby turning the sprockets 35, 36, and 66 in a clockwise direction, as viewed from the side of the table shown in FIG. 1. As the sprockets 36 and 35 turn in a clockwise direction, they pull the drive chains 40 and 41, respectively, from the chain loops around the respective sprockets 23 and 24. This tends to shorten those loops and adds lengths of chain around the loops formed by the sprockets 25 and 46, and 26 and 68, respectively. It may be seen that this shortening of the loops in the chains 40 and 41 moves the table body to the right on the pivot carriages 21 and 22. Simultaneously, the turning of the drive shaft 33 in a clockwise direction turns the sprocket 66 in a clockwise direction and the sprocket begins to track the tilt chain 62 downward, following the arcuate rail 69. While, in the present invention, the translational movement of the table body 20 is constant, the rotational movement in the clockwise and counterclockwise directions is nonlinear, changing very slowly around the horizontal position and changing rapidly near the vertical position of the table body 20. FIG. 5 illustrates, for example, the table body 20 translated approximately twelve and eleven-sixteenths inches towards the right from the center line CL and tilted to a position forty-five degrees from the horizontal. FIG. 6 illustrates the table body fully translated a distance of twenty-two inches from the center line CL of the table body 20 and tilted to a vertical position ninety degrees from the horizontal. If desired, the table body 20 can be stopped at any intermediate position by merely shutting off the power to the motor 30 when the table body 20 is at the desired position. When the table body 20 has translated the full distance of twenty-two inches and rotates to a vertical position, on upper limit switch and brake (not shown) may be provided which automatically opens the power supply circuit to the motor 30, thereby stopping the motor from rotating.

Assuming it is desired to rotate the table body 20 in a clockwise direction from either of the positions shown in FIGS. 1 and 6, the motor is merely actuated to turn the drive shaft in a counterclockwise direction, thereby shortening the loops of chains 40 and 41 around sprockets 25 and 46 and sprockets 26 and 68, respectively, and causing the tilt idler sprocket 65 to track the tilt chain 62 along the arcuate rail 69 until the table has rotated clockwise to the opposite vertical position from the one shown in FIG. 6.

Accordingly, the present invention provides an improved X-ray table that may be tilted in either direction from a horizontal position to an upright vertical position or to any intermediate position by means of a unique tilting mechanism that is entirely enclosed within the table body and out of the path of an examining physician who desires to walk completely around the table. Moreover, the suspension and drive mechanism provide a smooth and continuous tilting movement of the table body 20 while, at the same time, translating the table body so as to clear the floor.

While the X-ray table of the present invention has been described with reference to only one particular embodiment, it will be understood that various modifications could be made in construction thereof without departing from the spirit and scope of the invention. Thus, by way of example and not of limitation, one skilled in the art may fiind it advantageous to locate the driving mechanism at one of a number of locations within the table body or beneath it for driving either one or both of the shafts 33 and 47. Moreover, the table body 20 has considerable interior space for the inclusion of various types of X-ray accessories in addition to the bucky 60. In the drive mechanism, a tilt chain 62 and a chain guide 69 could be readily added to both sides of the X-ray table 10 without detracting from the accessibility of a patient lying on the table top because of the improved method provided by the present invention for causing the translating and tilting mechanisms to cooperate.

Other cooperative arrangements for sliding the table body 20 on the pivot carriage other than the roller mechanism described above might be substituted by those skilled in the art. However, it is submitted that the apparatus which is described provides the most simply constructed and reliable method of supporting the table body on the pivot carriages 21 and 22. Moreover, the described apparatus produces a smooth translational movement at any preselected speed without abrupt steplike increments which create intermittent table movement often uncomfortable for many patients and disruptive of many X-ray examinations for which the table 10 may be used.

Further, it is possible to eliminate one of the supporting columns and substitute therefor a more rigid arcuate rail which would extend beneath the table body 20 and ride in a track provided on the base 18 substantially in line with the remaining column 19 for allowing the arcuate rail to slide in the track as the table body traverses and rotates. Accordingly, it is to be expressly understood that the foregoing description shall be interpreted only as illustrative of the invention and that various changes may be made without departing from the spirit of the invention as defined in the appended claims.

What is claimed as new is:

1. An X-ray table including a table body mounted for complex motion composed of a translational motion component within its own plane and a rotational motion component about an axis defined by pivot assemblies which are supported by a stationary table base structure, and driving means mounted to the table body for producing each of the two motion components, the driving means comprising:

at least one power-actuated rotatable driving sprocket; arcuate track means for producing said rotational motion, said arcuate track means including a first chain cooperatively engaged to said driving sprocket which, when driven, rolls along said first chain, said arcuate track means and said first chain having a line of symmetry normal to the useful surface of said table body, an anchoring assembly securing the ends of said chain to said stationary base structure, said arcuate track means including an arcuate rail secured to said table body and slideably engaged by said first chain for securing said first chain in a predetermined configuration to said table body; and means for producing said translational motion component, said means including at least a pair of second sprockets located at the respective ends of said table, a pulley arrangement secured to said pivot carriage assemblies, a second chain which has its respective ends secured to the respective ends of said table body, said second chain being conducted in a zig-zag configuration over said pair of secured sprockets and said pulley arrangement, so that one of said second sprockets, when driven to rotate, causes said table body to perform a translational motion in one or the other direction with respect to said pivot assemblies, so that the complex motion of said table body is accompanied by changes in distance between said axis of rotational motion component and said line of symmetry of said first chain, and said arcuate track rail slideably engaged by said first chain ensures that the angular speed of said rotational motion component decreases and increases when said distance becomes shorter and longer, respectively.

2. An X-ray table as recited in claim 1, wherein said arcuate rail securing said first chain in said predetermined configuration to said table body has a curvature such that the distance between said arcuate track and said useful surface of said table body is at a maximum in the central area between the two ends of said table body, so that, with constant driving speed and a constant translational motion component, said angular speed of said rotational motion component is at a minimum during angular displacement in ranges about the horizontal orientation of said table body, and said angular speed of said rotational motion component increases toward a maximum during angular displacement in ranges approaching the vertical orientation of said table body.

References Cited

UNITED STATES PATENTS

| | | |
|---|---|---|
| 2,799,542 | 7/1957 | Raska et al. |
| 2,872,584 | 2/1959 | Schiring et al. |
| 2,901,302 | 8/1959 | Kizaur. |
| 3,096,976 | 7/1963 | Koerner et al. |
| 3,131,301 | 4/1964 | Barrett et al. |

WILLIAM F. LINDQUIST, Primary Examiner

U.S. Cl. X.R.

250—57